United States Patent
Tanner

(10) Patent No.: US 6,618,053 B1
(45) Date of Patent: Sep. 9, 2003

(54) ASYNCHRONOUS MULTILEVEL TEXTURE PIPELINE

(75) Inventor: Christopher C. Tanner, Cupertino, CA (US)

(73) Assignee: Vicarious Visions, Inc., Troy, NY (US)

( * ) Notice: Subject to any disclaimer, the term of this patent is extended or adjusted under 35 U.S.C. 154(b) by 0 days.

(21) Appl. No.: 09/684,315

(22) Filed: Oct. 6, 2000

Related U.S. Application Data

(60) Provisional application No. 60/175,277, filed on Jan. 10, 2000.

(51) Int. Cl.$^7$ ............................................. G06T 11/40
(52) U.S. Cl. ........................ 345/552; 345/557; 345/582
(58) Field of Search ................................ 345/552, 557, 345/582, 506, 428, 555, 501, 587; 711/118, 119

(56) References Cited

FOREIGN PATENT DOCUMENTS

| EP | 0 890 925 A2 | 1/1999 | ............ G06T/15/10 |
|----|--------------|--------|------------------------|
| WO | WO 98/28713  | 7/1998 | ............ G06T/15/10 |
| WO | WO 98/29838  | 7/1998 | ............ G06T/15/10 |
| WO | WO 99/23610  | 5/1999 | ............ G06T/15/00 |

OTHER PUBLICATIONS

Frank, et al., "Multiple Representations for Cartographic Objects in a Multi–scale Tree—An Intelligent Graphical Zoom," *Computers and Graphics*, United Kingdom, vol. 18, No. 6, Nov. 1, 1994, pp. 823–829.

Tanner, et al., "The Clipmap: A Virtual Mipmap" [online]. International Conference on Computer Graphics and Interactive Techniques, Proceedings of the 25$^{th}$ Annual Conference on Computer Graphics, Jul. 1998, ACM Digital Library [retrieved on Jan. 19, 2001]. Retrieved from the Internet: <URL: http://dev.acm.org.pubs/citations/proceedings/graph/280814/p151–tanner/>, 9 pages.

*Primary Examiner*—Kee M. Tung
(74) *Attorney, Agent, or Firm*—Fenwick & West LLP

(57) ABSTRACT

A texture loading pipeline loads textures for use in rendering an object. A source texture has one or more levels of detail. Each level of detail (LOD) contains texture tiles for a particular area of a global coordinate space at a particular resolution. There are no mandatory relationships between the areas represented by, or the resolutions of, different levels of detail. An instance of the texture loading pipeline exists for each LOD in the source texture. The texture tiles of a LOD are stored in a texture storage, which can be local or remote from the texture loading pipeline. An asynchronous request queue (ARQ) retrieves texture tiles in a region of interest from the texture storage and stores the tiles in a tile cache. Toroidal roaming is used to page textures in the region of interest from the tile cache to a texture cache. The toroidal roaming performs the best possible update of the texture cache given a limited update time. A pipeline driver drives the pipeline by providing the region of interest to the tile cache and the region of interest and an update time to texture cache. The majority of processing time is devoted to the highest-resolution texture loading pipeline that can keep up with the rate of change in the region of interest. After an update cycle, a texture selector selects the textures in the texture cache having the best set of textures for the region of interest and those textures are used to render the 3-D scene.

39 Claims, 5 Drawing Sheets

ASYNCHRONOUS MULTILEVEL TEXTURE PIPELINE

CROSS-REFERENCE TO RELATED APPLICATION

This application claims the benefit of U.S. Provisional Application No. 60/175,277, filed Jan. 10, 2000.

BACKGROUND

1. Field of the Invention

This invention pertains in general to computer graphics and in particular to a texture loading pipeline in a three-dimensional graphics system.

2. Background Art

Texture mapping has become a very common feature in computer systems such as game consoles, personal computers, and high-end workstations. Traditionally, texture mapping is used to add realism to computer graphics images without increasing the amount of geometry necessary to produce the images.

The concept of texture mapping is relatively simple: stretch an arbitrary image and paste it onto a three-dimensional (3-D) geometry. Mapping the texture to the 3-D geometry consists of computing, for each picture element (pixel) in the final image, the corresponding texture element (texel) in the texture image. There are many different techniques for performing this computation. In general, each of the techniques treats each pixel as a surface that has a corresponding surface in the texture image. The texture surface covered by a given pixel can contain an arbitrary, and not necessarily integer, number of texels of different colors. Each pixel, however, can have only one color. Usually, the color of the pixel is determined by taking multiple samples from the texture and filtering the samples at different stages of the rendering to derive the appropriate color.

When the textures are large, it is difficult to sample and filter the texture at the rate needed to rapidly draw 3-D scenes from changing perspectives. Specialized computer systems with large memories and fast graphics pipelines can use a brute force approach to process large textures at rates necessary to support the scene changes. However, dedicated hardware is often prohibitively costly and cannot be used in mass market platforms.

A common technique for overcoming this hurdle and dealing with large textures is a "mipmap." A mipmap is a storage technique that stores a texture at multiple levels of resolution. A mipmap resembles an inverted pyramid. The top of the mipmap represents the largest texture having the highest amount of detail. Each level below the top has a resolution a power of two smaller than the previous level, and holds that much less detail. For example, if the top mipmap level of a two dimensional texture holds 64 texels, the immediately lower level has 16 texels. Subsequent levels hold four and one texel.

When a mipmapped texture is mapped on a polygon, the mipmap level that corresponds most closely to the size of the polygon is used. For example, if the polygon is a square having four pixels on a side, the mipmap level having 16 texels will be mapped onto the polygon. In effect, the mipmap reduces hardware demands by performing the image processing and filtering (i.e., scales down the texture to fit the polygon) ahead of time.

Storing a mipmap requires only ⅓ more memory than storing the original texture. However, storing even this much more data creates a problem. Textures must be stored in fast memory in order to meet the needs of renderer. The fastest systems use special memory for texture storage while slower systems use the fast video memory in the display buffer for texture memory. Textures can easily be too large to fit in these memories. For example, a texture representing North America at 25 meter resolution occupies more than 200 gigabytes of memory.

One solution to this problem is to subdivide the geometry. For example, a texture representing North America can be divided into four areas, which, in turn, can be subdivided into smaller areas. The texture can be divided and subdivided in the same manner as the geometry into smaller textures called "tiles." Since the tiles are smaller than the original texture, the tiles can be stored, manipulated, and processed at the rate necessary to support 3-D rendering. Tiling, however, creates visible artifacts in the rendered scene, such as seams at the edges of the tiles. It may be possible to eliminate the artifacts from one viewpoint in the final image, but not from all possible viewpoints. Another disadvantage of tiling is that a complex database must be used to store the tiles and substantial processing time is required to regenerate the tiles whenever the texture is modified. Further, tiling requires that the underlying geometry be divided on the texture boundaries such that edges of the texture tiles match the edges of the geometry tiles, thereby making both automatic and real-time geometric reconstruction of underlying surfaces extremely difficult.

Another problem with mipmaps is that the large source texture might be composed of many smaller textures linked together. Some of textures might be from different sources and, therefore, have different resolutions (i.e., texels per unit of coordinate space). For example, a texture map of a large area, such as North America, might use low-resolution sources for textures of less populated areas and high-resolution sources for textures of more populated areas. Mipmaps do not provide a general way to represent the different resolutions of the textures. The fixed requirement that levels be separated by powers of two limit the use of mipmaps in this regard.

Accordingly, there is a need for a way to represent, store, and process texture data in a way that supports real-time 3-D rendering. The solution to this need should support the use of large textures and textures having differing resolutions and coordinate spaces.

DISCLOSURE OF THE INVENTION

The above needs are met by a texture loading pipeline that operates on a source texture having one or more levels of detail. Each level of detail (LOD) represents a rectangular subset of a particular region of the source texture at a particular resolution. There can be arbitrary relationships between the regions and resolutions represented by particular levels of detail. Thus, the source texture can be sparse and different levels of detail can represent different regions of the source texture at different resolutions.

Preferably, there are multiple instances of the texture loading pipeline, with each instance corresponding to one of the levels of detail in the source texture. The texture for a LOD is preferably subdivided into tiles and stored in a storage space. The storage space can be local to the computer system executing the texture loading pipeline and/or remote from the computer system. For example, the storage space can be located on a hard drive or CD-ROM attached to the computer system and/or in communication with the computer system through a network. The texture tiles can be compressed or uncompressed.

Texture tiles are retrieved from the storage space by an asynchronous request queue and stored in a tile cache. Compressed texture tiles are preferably stored in a compressed tile cache. An asynchronous decompression queue decompresses the texture tiles in the compressed tile cache and stores the decompressed tiles in a decompressed tile cache.

Textures in the region of interest are paged from the tile cache into a texture cache. The texture cache is preferably located in a high-speed memory, such as a dedicated texture memory in a graphics adapter. The textures in the region of interest, i.e., the region of the global coordinate space for which textures are requested, are preferably selected for paging via toroidal roaming. In toroidal roaming, an arbitrary rectangle, or other bounding shape, specifies the textures in the tile cache to page into the texture cache. The rectangle moves as the region of interest changes. Texels that leave the region of interest are deleted from the texture cache, texels that enter the region of interest are paged into the texture cache, and texels remaining in the region of interest are left in the texture cache.

By definition, the size of the region of interest is bounded by the resolution of the display 118. The resolution of the display, refresh rate, and color depth of the textures, therefore, also define an upper bound on the rate of data, or bandwidth, required to update the texture cache. The real bandwidth, however, is often lower than the upper bound because there is usually spatial coherency between adjacent frames. Toroidal roaming exploits this coherency to reduce the needed bandwidth. It is apparent that a pipeline for a lower-resolution LOD can support an effectively higher bandwidth through the original image than a higher-resolution pipeline since the lower-resolution pipeline needs less texture paging in response to most changes in the region of interest.

A pipeline driver outputs the region of interest to the tile cache and the region of interest, a maximum resolution cutoff, and an update time to the texture cache. The maximum resolution cutoff preferably specifies the highest LOD for which the textures in the region of interest should be cached. Pipelines that cannot meet the rate of data flow given the change in the region of interest are preferably cut off since no benefit would be gained by executing those pipelines.

The update time input specifies the amount of processing time available to each pipeline. The majority of processing time is preferably devoted to the pipeline for the highest resolution LOD that can meet the rate of data flow given the change in the region of interest. Some processing time is also preferably devoted to the pipelines for the lower levels of detail in case the optimal pipeline fails to meet the needed rate of data flow.

At the end of certain update periods, the textures are bound to a geometry in order to render a 3-D scene. To perform this task, a texture selector selects among the texture caches of the different pipelines for the cache having the best complete set of textures. The selected textures are transformed by a hardware texture matrix from the arbitrary local coordinate space to the global coordinate space. Then, the textures are simply "bound" and used to render on geometry using a simple texture coordinate specification. For the rest of the system, this collection of pipelines acts as a single large mipmapped texture with a single coordinate system. The specific operations of the underlying pipelines are invisible to the rest of the system.

Accordingly, the present invention allows arbitrarily large textures to be represented as a single texture with a single coordinate system. The rendering system "thinks" of this texture as "just another texture." Also, since the underlying caching mechanisms are multi-level asynchronous look-ahead caches, a fixed amount of bandwidth-bounded and directly proportional to screen resolution-can be used to represent a texture of arbitrary size.

DETAILED DESCRIPTION OF THE PREFERRED EMBODIMENTS

The present invention is a texture loading pipeline system and method, and a texture representation, that allows an extremely large and detailed source texture to be used in a three-dimensional (3-D) graphics environment. The phrase "source texture" refers to a set of texture data for a geometry in a 3-D scene, and may, for example, occupy a petabyte (i.e. $2^{50}$ bytes) or more of storage. The source texture can have different components with different resolutions and can be sparse. Thus, the texture data can come from different sources having different inherent resolutions. The source texture is formed by fitting together the source data using a single unifying coordinate system. In one embodiment, the unifying coordinate system is the global coordinate space, i.e., the object having the geometry to which the texture will be applied.

The present invention preferably represents the source texture as a set of smaller textures, called "levels of detail." Each level of detail (LOD) preferably contains a sparse, tile-based subset of a particular resolution of the larger source texture. Unlike with a mipmap, there can be arbitrary relationships between the levels of detail and each LOD need not represent the same area in the global coordinate space. For example, the source texture can be represented by three levels of detail. One LOD can represent North America at a first resolution. Another LOD can represent only certain cities in North America at a second, higher, resolution, while yet another LOD can represent the entire Earth at a third, lower, resolution. Representing the Earth at one meter resolution typically requires approximately 25–30 levels of detail.

Figure 1:
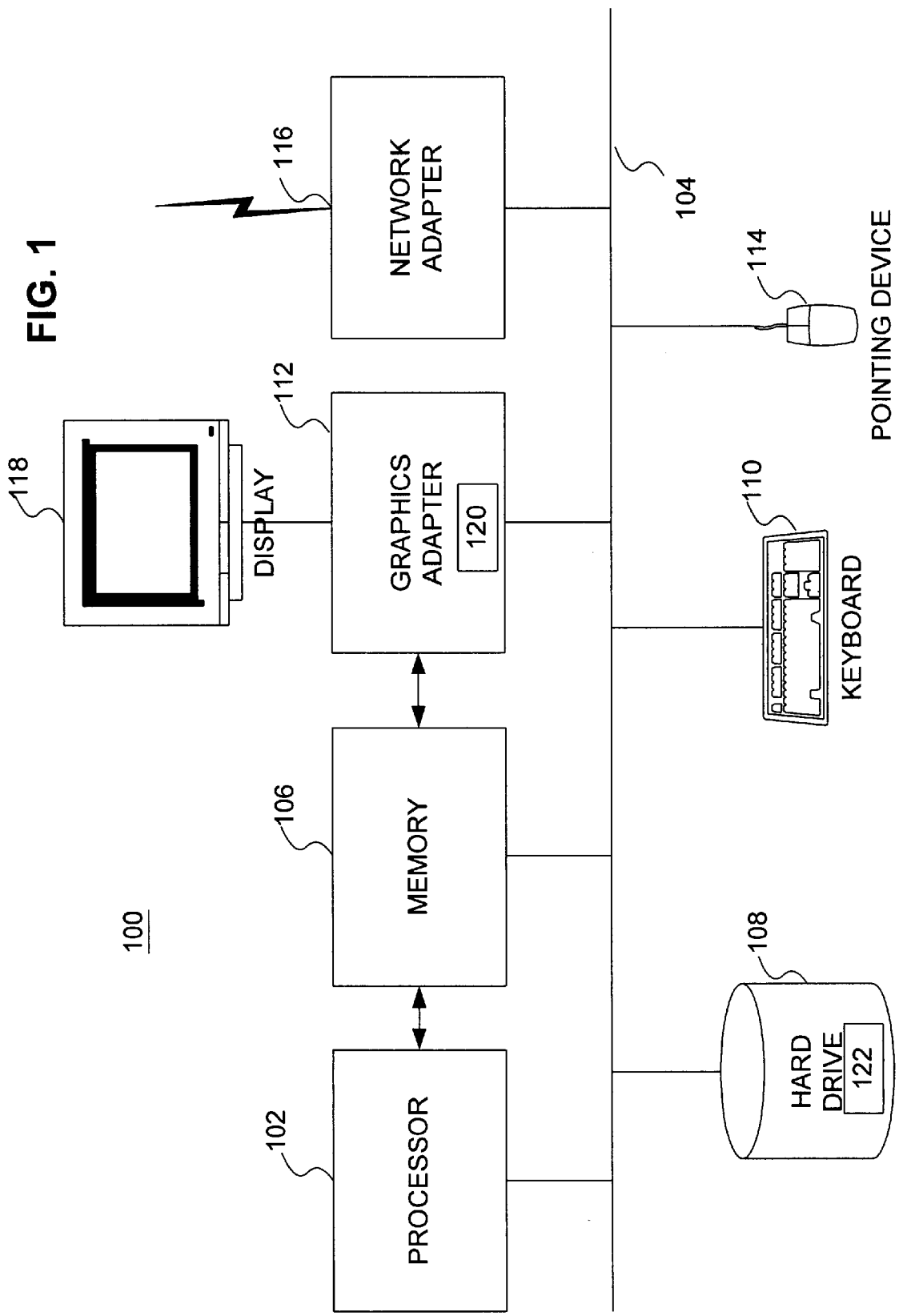
FIG. 1 is a high-level block diagram of a computer system, such as a personal computer, a game console, a stand-alone video game, or a high-performance graphics workstation, for executing a texture loading pipeline according to an embodiment of the present invention.

FIG. 1 is a high-level block diagram of a computer system, such as a personal computer, a game console, a stand-alone video game, or a high-performance graphics workstation, for storing a source texture and executing the texture loading pipeline according to an embodiment of the present invention. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112.

The at least one processor 102 may be any general-purpose processor such as an INTEL x86, POWERPC, or MIPS-compatible central processing unit (CPU). The storage device 108 may be any device capable of holding large amounts of data, like a hard drive, compact disk read-only memory (CD-ROM), DVD, or some other form of fixed or removable storage device. The memory 106 holds instructions and data used by the processor 102. The pointing device 114 may be a mouse, track ball, light pen, touch-sensitive display, or other type of pointing device and is used in combination with the keyboard 110 to input data into the computer system 100. The network adapter 116 optionally couples the computer system 100 to a local or wide area network.

The graphics adapter 112 preferably has a memory 120 for storing textures and other data for display on the display 118 and optionally has specialized hardware for rendering 3-D graphics. The graphics adapter is preferably controlled through a 3-D application programming interface (API) such as OPENGL from SGI, Inc. or DIRECT3D from Microsoft Corp.

Program modules 122 for executing the texture loading pipeline according to an embodiment of the present invention are stored on the storage device 108, loaded into the memory 106, and executed by the processor 102. Alternatively, hardware or software modules may be stored elsewhere within the computer system 100. In one embodiment of the present invention, the operation of the computer system 100 is controlled by the WINDOWS 2000 operating system, although other operating systems such as LINUX or a dedicated game console operating system, such as the SONY PLAYSTATION 2 operating system, can be used as well.

Figure 2:
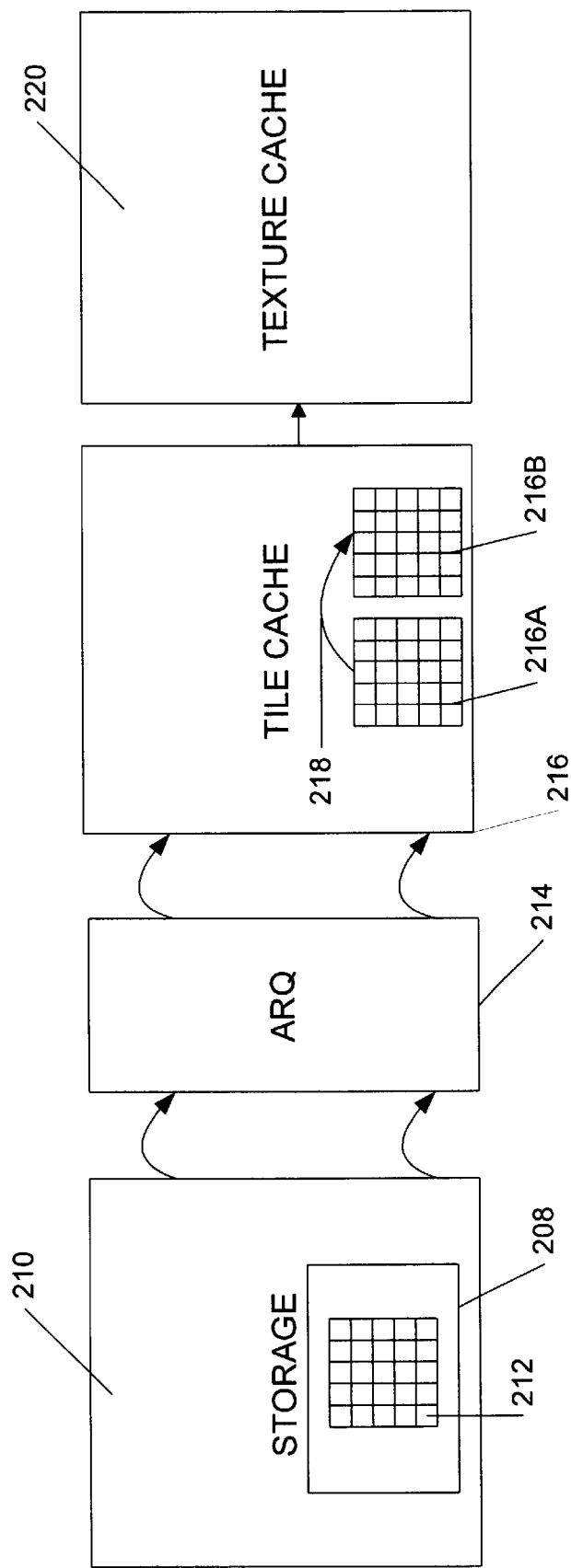
FIG. 2 is a high-level block diagram illustrating an embodiment of the texture loading pipeline.

FIG. 2 is a high-level block diagram illustrating an embodiment of the texture loading pipeline 200. Preferably, the texture loading pipeline 200 is replicated for each LOD of the source texture 208. Thus, if there are four levels of detail for the source texture 208, there are preferably four texture loading pipelines 200 for the source texture. Typical embodiments of the present invention can have more than 15 texture loading pipelines 200. The pipelines 200 can be logically or physically separate and particular pipelines can be created or destroyed as warranted. Each pipeline 200 operates independently of the other pipelines on a single LOD in order to maximum total concurrency and throughput. In addition, the elements of each pipeline 200 operate asynchronously wherever possible. When multiple pipelines share a single resource, such as a disk paging queue or a texture paging bus, a resource manager preferably manages that resource to provide maximum concurrency and throughput. Except where otherwise indicated, the following description refers to a single instance of a texture loading pipeline 200.

The source texture 208, including the LOD 212, is stored in a storage space 210. The storage space 210 can be, for example, the storage device 108 locally coupled to the computer system 100 or a remote storage coupled to the network adapter 116 of the computer system via a local area network (LAN), wide area network (WAN), or some other form of network. For example, all or part of the source texture 208 can be stored in a server located on the Internet and the computer system 100 can be coupled to the Internet via a telephone, digital subscriber line (DSL), or cable modem or an Ethernet connection.

The source texture 208 stored in the storage space 200 is preferably subdivided into tiles. Each tile has a particular resolution and, thus, belongs to a certain LOD 212. Each LOD 212 has a coordinate space arbitrarily defined as extending from zero to one. Preferably, a particular tile in the LOD 212 is identified by its location in the global coordinate space. The tiles can be stored in a compressed format, such as the Graphics Interchange Format (GIF), compressed using another known compression algorithm such as Joint Photographic Experts Group (JPEG), JPEG2000 or another form of wavelet compression, or uncompressed.

The tiles in the LOD 212 are retrieved, or paged, from storage 210 by an asynchronous request queue (ARQ) 214. The ARQ 214 receives as input a reference to a specific tile, such as the location of the tile in the global coordinate space, retrieves the tile from storage, and provides the tile as output. In one embodiment, the ARQ 214 holds all tile requests as a batch list of requests. These batched requests can be resorted, prioritized, or eliminated based on updates from the rest of the system. For example, the requested tiles can be sorted or prioritized based on whether the tiles are still needed, when the tiles are needed, and/or how "important" the tiles are.

Tiles output by the ARQ 214 are provided to a tile cache 216. The tile cache 216 can be located in either the memory 106 or on the storage device 108. If some or all of the tiles are compressed, the tile cache 216 preferably has two separate components: a compressed tile cache 216A for holding compressed tiles retrieved from the storage space 210 and an uncompressed tile cache 216B for holding uncompressed tiles. Preferably, an asynchronous decompression queue 218 operates within the texture cache 216 to decompress the tiles in the compressed tile cache 216A and move the tiles to the uncompressed tile cache 216B. Alternatively, the tiles can be decompressed at another stage in the pipeline 200. For example, a decompression engine can be integrated into the ARQ 214 such that the tiles are decompressed as the tiles are paged from storage 210. The tile cache 216 is preferably large enough to enable look-ahead caching on tiles surrounding the region of interest. In look-ahead caching, tiles surrounding the region of interest are requested prior to the tiles being needed by the underlying texture caching system.

Preferably, the decompression queue 218 or another operator in the tile cache 216 can also perform image processing on the texture tiles. For example, assume that a set of tiles for one LOD stored in the storage space 210 holds ground textures for the Earth, a set of tiles for another LOD holds country border lines, and the ARQ 214 is modified to retrieve tiles from both levels of detail. The operator in the tile cache 216 can combine the levels of detail by overlaying the border lines on top of the ground textures to produce a single LOD with texture tiles having both ground textures and border lines. Since this processing happens near the beginning of the texture loading pipeline 200, the processing is transparent to the rest of the pipeline.

Preferably, the tile cache 216 can hold a large number of texture tiles and uses an algorithm to determine when to purge tiles from the cache. Textures in the tile cache 216 are paged into the texture cache 220. The texture cache 220 is preferably stored in the dedicated texture memory 120 in the graphics adapter 112. Alternatively, the texture cache 220 can be located in main memory 106 or another fast memory.

Figure 3C:
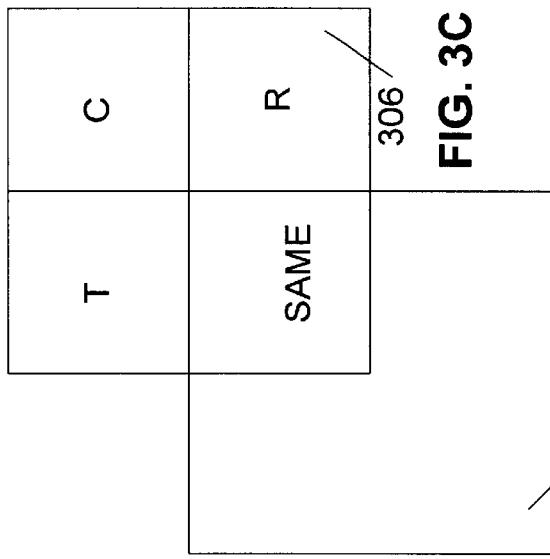
FIGS. 3A–3C illustrate toroidal roaming.
Figure 3A:
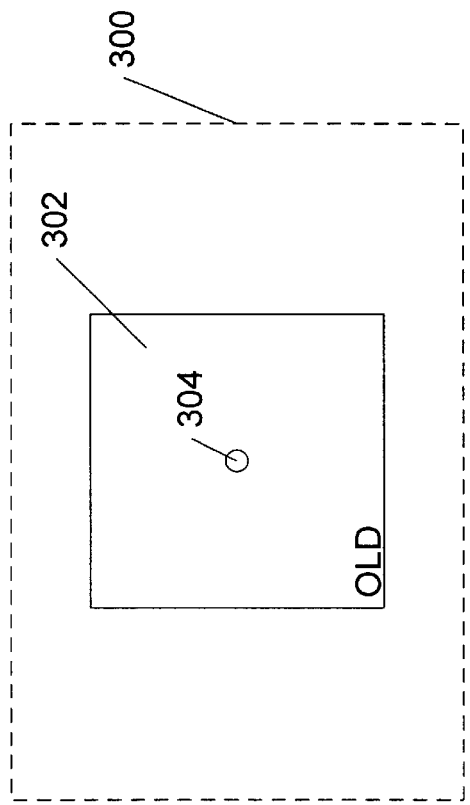
Figure 3B:
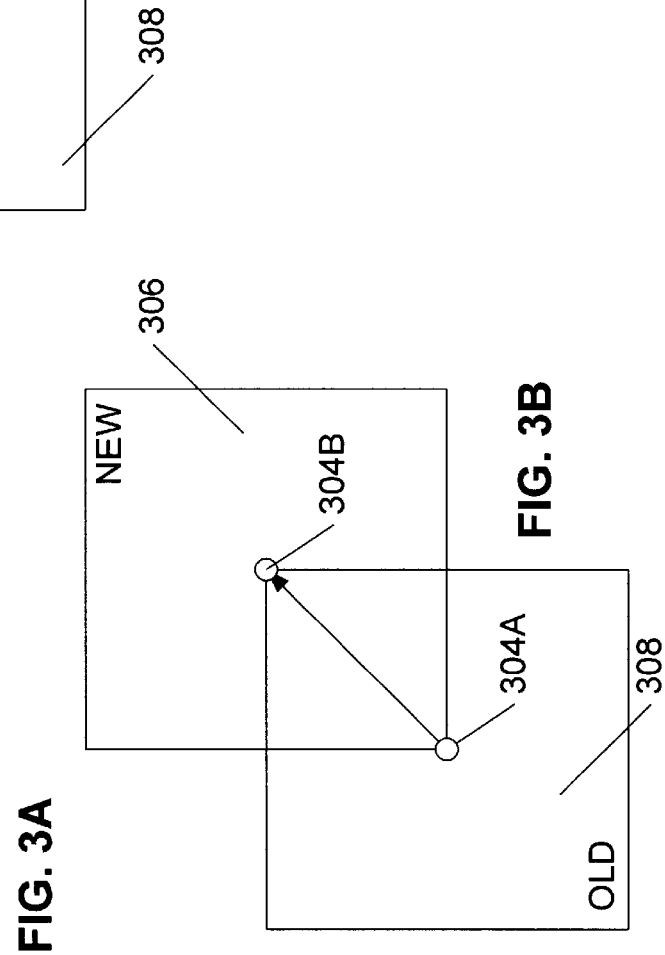

The present invention preferably uses toroidal roaming to determine which textures to page into the texture cache 220. FIGS. 3A–3C illustrate toroidal roaming. The tiles in the tile cache 216, or a subset of the tiles, when aligned, define a surface 300. The surface can be sparse if not all of the tiles in the surface have been loaded into the tile cache 216 from storage 210. An arbitrary rectangle 302, or some other shape, having a center point 304 defines the current region of interest—the region of the global coordinate space for which textures are requested. The region of interest is typically defined by the textures needed to cover the geometry of an object being rendered in the 3-D scene. As mentioned above, the region of interest is also used as a reference for speculative paging (i.e., look-ahead caching) of tiles into the tile cache 216. Speculative paging pages tiles into the tile cache when the tiles might be used in subsequent renderings due to some spatial coherence between the region of interest and the viewpoints of the renderings.

When a user (or other controller) pans or otherwise moves around the geometry, the rectangle 302 defining the region of interest responsively moves across the tiled surface 300 (the surface 300 is only shown in FIG. 3A). In FIG. 3B, the center of the region of interest translates from position 304A to position 304B. This translation causes new textures 306 on the surface 300 to be covered by the defined region of interest 306 and old textures 308 to leave the region of interest.

FIG. 3C more clearly illustrates the textures entering, exiting, and staying within the region of interest. FIG. 3C illustrates the new 306 and old 308 positions of the region of interest. Some textures, labeled "SAME" in FIG. 3C are in both regions of interest. New textures in the top T, center C, and right R are in the new region of interest 306. The remaining textures are in the old region of interest 308. In toroidal roaming, the textures in the new region of interest 306 are paged into the texture cache 220, the textures only in the old region of interest 308 are deleted from the texture cache, and textures remaining in the region of interest (i.e., the textures marked SAME) remain in the texture cache.

The maximum size of the region of interest is defined by the resolution of the display 118. The display 118 typically has a fixed resolution, such as 640×480 or 1024×768, that represents the maximum size of a texture that can be displayed on the display, assuming a one-to-one correspondence between the texels in the texture and the pixels on the display. The resolution of the display, therefore, also defines an upper bound on the rate of data flow, or bandwidth, required to update the texture cache 220. Assume, for example, that the display 118 has a resolution of 640×480, is updated at a rate of 60 Hz and, uses 32 bits per pixel. The maximum bandwidth of textures into the texture cache 220 necessary to support the display is 307200 pixels * 32 bits * 60 Hz=70.3 megabytes/second. This figure, however, assumes that the region of interest completely changes with every update of the display. In reality, each region of interest can be expected to overlap with, or be the same as, previous regions of interest.

From the discussion above, it is apparent that a pipeline for a lower-resolution LOD will usually provide a higher level of perceived data flow than a higher-resolution pipeline. Since the textures for a lower-resolution LOD cover a greater area in the global coordinate space than higher-resolution textures, less paging will probably be needed for any given change in the region of interest. Conversely, the higher the resolution, the more paging that may need to be performed. However, as discussed above, the rate of change of data on the display places a fundamental limit on the paging requirements since it is possible to only resolve a finite number of texels on the screen at one time.

In sum, the texture loading pipeline 200 provides two-stage caching of textures. The tile cache 216 acts as a large second level cache and can hold texture tiles surrounding and including the region of interest. The texture cache acts as a first level cache and holds the textures for the region of interest. The caches operate asynchronously to maximize throughput and concurrency.

Figure 4:
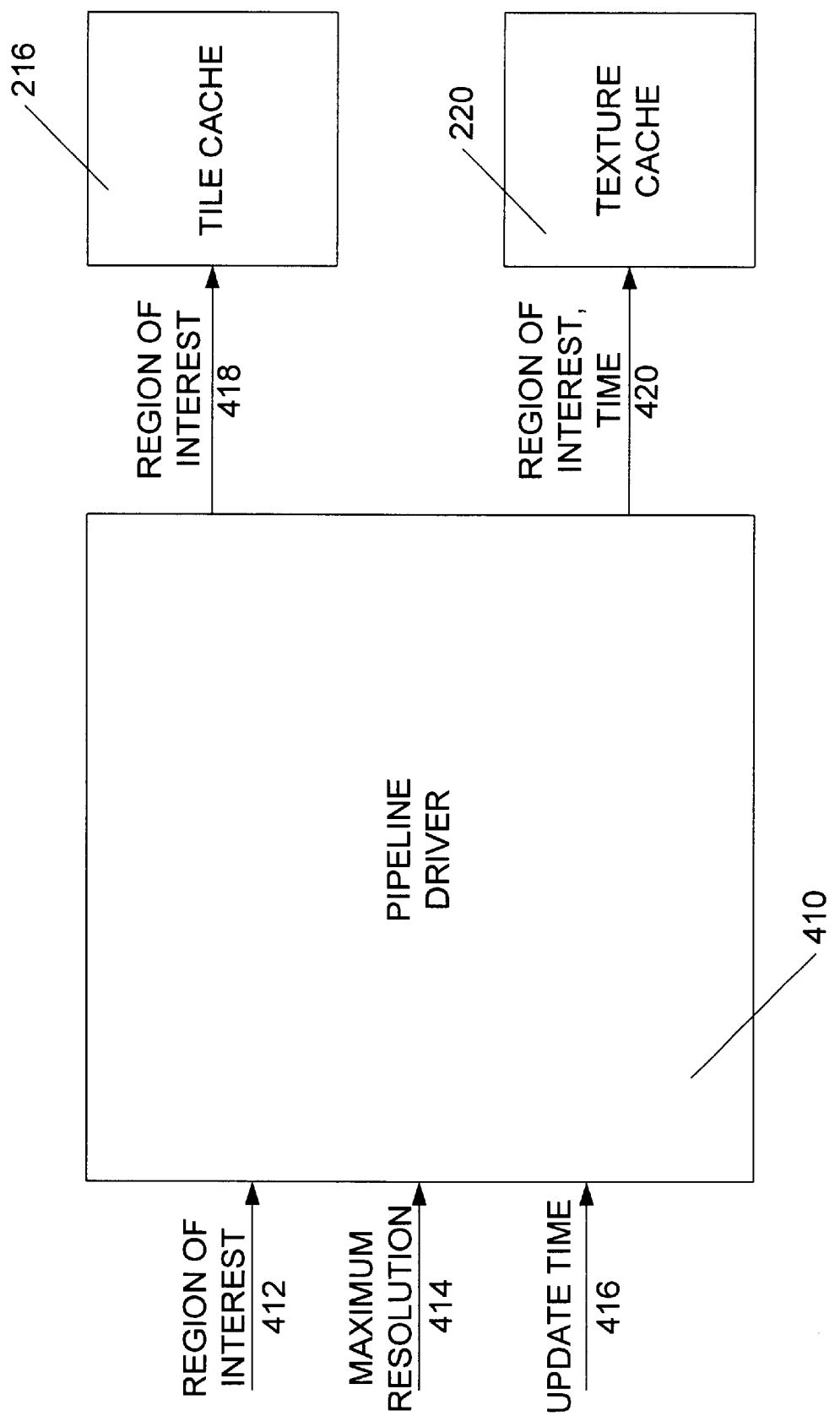
FIG. 4 is a block diagram illustrating the pipeline driver for driving the texture loading pipeline of FIG. 2.

FIG. 4 is a block diagram illustrating the pipeline driver 410 for driving the texture loading pipeline 200 of FIG. 2. The pipeline driver 410 is preferably a logical entity executed by the computer system 100. In one embodiment, a single pipeline driver 410 drives all of the pipelines. In an alternative embodiment, a separate pipeline driver 410 drives each or multiple pipelines.

The pipeline driver 410 receives at least three inputs: region of interest 412, maximum resolution 414, and update time 416. The region of interest input 412 specifies a region of the source texture 212 using coordinates in the global coordinate space. The region can be specified using any available technique. For example, the input 412 can specify the borders of the region, the center and radius of the region, and/or provide an equation specifying the region. If the region is specified by something other than coordinates in the global coordinate space, the pipeline driver 210 preferably converts the specification into such coordinates.

The maximum resolution input 414 specifies the highest resolution LOD for which the textures in the region of interest should be cached, preferably by specifying a maximum resolution cutoff. In one embodiment of the present invention, pipelines that cannot meet the required bandwidth given the change in the region of interest are cut off since no benefit would be gained by executing those pipelines. These pipelines are subsequently re-enabled as soon as they are able to both keep up with the required changes in the region of interest and provide texels that will be used by the texture filtering algorithm currently in use.

The update time input 416 specifies the amount of time available to page textures into the texture cache 220. Preferably, the update time is specified in milliseconds and is linked to the refresh rate of the computer system display 118. A preferred embodiment of the present invention can specifically allocate time to different texture loading pipelines 200 or specify a percentage of processing time to devote to each pipeline. In a preferred embodiment of the present invention, the majority of processing time is devoted to the pipeline for the highest resolution LOD that can meet the bandwidth requirements (i.e., the highest resolution pipeline below the maximum resolution cutoff). Some processing time is also preferably devoted to the pipelines for the lower-resolution levels of detail in case the optimal pipeline fails to meet the required bandwidth. Preferably, no processing time is spent on the pipelines above the maximum resolution cutoff.

For example, if the region of interest is changing very quickly and, therefore, the required bandwidth is high, then the majority of processing is preferably devoted to a pipeline for a relatively low-resolution LOD. Since the low-resolution LOD will not need to engage in as much paging as a higher-resolution LOD, the pipeline for the lower-resolution level can update the texture cache at the required rate. Conversely, when the region of the interest changes more slowly, the required bandwidth decreases. Therefore, a preferred embodiment of the present invention devotes more processing time to the pipeline for a higher LOD, since that pipeline will be able to keep up.

The inputs 412, 414, 416 of the pipeline driver ate driven by an upstream module in the computer system. The upstream module can be, for example, part of an application program such as a game, simulation, mapping program, or other application that renders 3-D scenes. The upstream module can adjust the values of the inputs 412, 414, 416 in real-time responsive to its needs. For example, if the present invention is supporting an application program that presents a graphical display of the Earth, the application program can adjust the inputs 412, 414, 416 as a user pans, zooms, or teleports around the globe.

The pipeline driver 410 has one output 418 coupled to the tile cache 216 and another output 420 coupled to the texture cache 220. The first output 418 provides the region of interest to the tile cache 216. In response, the tile cache 216 generates and sends paging requests to the ARQ 214, including speculative paging requests. The second output 420 provides the region of interest and the update time to the texture cache 220. In response, the texture cache 220 uses toroidal roaming to do the best possible update given the update time and cache paging performance. The "best possible" update can be determined using either predictive or reactive timing. The values on the outputs 418, 420 can be identical to the values received on the corresponding inputs 412, 416 or can be modified by the pipeline driver 410.

At the end of the update period specified by the update time, the pipeline to which most of the processing time has been devoted will ideally have the complete set of textures for the region of interest in its texture cache 220. It is possible, however, that the pipeline has failed to load all of the required textures. Therefore, it may be necessary to utilize the textures in the texture cache of another lower-resolution, pipeline. In one embodiment of the present invention, the texture cache 220 returns a value to the pipeline driver 410 indicating the time actually spent updating the texture cache. The pipeline driver 410 can use this feedback to estimate the time utilized or required by texture caches 220 in other pipeline instances.

Figure 5:
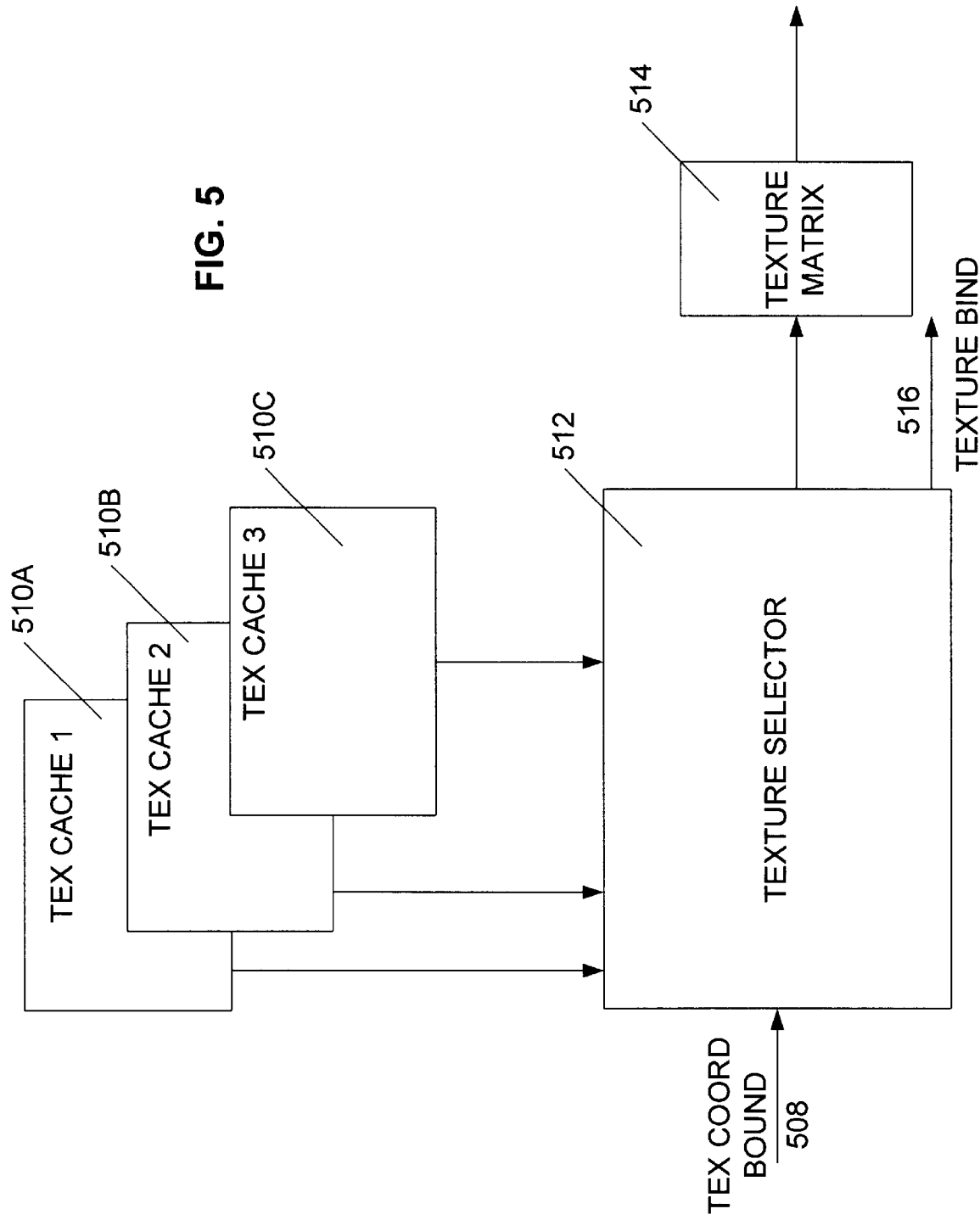
FIG. 5 is a block diagram illustrating how the contents of a texture cache are selected and bound to a group of polygons.

FIG. 5 is a block diagram illustrating how the contents of the texture caches are selected and bound to a group of polygons. FIG. 5 illustrates three texture caches 510A, 510B, 510C from three different texture loading pipelines 200. The three texture caches 510 each cache textures at a different LOD and may have full or partial textures for a given region of interest at a particular instance in time. In one embodiment of the present invention, a texture selector 512 receives an input 508 indicating the texture coordinate bound or other view or screen space-dependent criteria and selects the cache that best meets the criteria. In other embodiment, the texture selector 512 selects the cache having the most complete textures for the given region of interest.

Recall that the textures in a LOD exist in an arbitrary local coordinate space defined as ranging from zero to one. Thus, the textures in the texture cache must be transformed from the arbitrary coordinate space to the global coordinate space. Preferably, the matrix for performing this transformation is held within the texture matrix 514. The texture matrix 514 performs the transformation on the textures in the selected texture cache 510. In a typical computer system, access to a hardware texture matrix 514 within the graphics adapter 112 is controlled by the 3-D API. This hardware texture matrix is commonly used to perform special effects on textures. A preferred embodiment of the present invention, in contrast, uses the hardware texture matrix to perform a coordinate transform. This technique unifies all of the textures into a single effective texture with a straight-forward coordinate space. The output of the texture matrix 514 is passed to downstream modules in the computer system 100 for use in rendering a 3-D scene. The texture selector 512 also preferably outputs a texture bind 516 that selects the appropriate texture cache in the fast texture memory. On some systems that allow multiple active textures, it is possible to perform more advanced texture sampling by simultaneously activating several texture caches and their corresponding texture matrixes.

An advantage of the present invention is that it provides relatively blurry images when the region of interest is changing quickly and relatively sharp images when the region of interest changes slowly, thereby mimicking the operation of the human eye. Another advantage of the present invention is that it scales to all resolutions/levels of details. The present invention works just as well regardless of whether the user is examining a texture having a resolution of one texel per kilometer or one texel per centimeter.

The following is exemplary pseudocode for using the texture loading pipeline 200 as part of an interactive graphics rendering system.

```
Main()
{
    While (not end of program)
    { . . .
        Read inputs;                                        //1
        Compute new observer position;                     //2
        Set texture region of interest;                    //3
        Update inputs to asynchronous paging queue         //4
        . . .
        for (each visible object in the database)          //5
            Select source texture to be used;
            If (source texture has multiple levels of detail)  //7
                Set level of detail active texture coordinate bound;  //8
            . . .
            Set other graphical states;                    //9
            Draw object using texture;                     //10
        . . .
    }
}
```

The "while" loop is the rendering loop and is designed to work at the same speed as the display 118 refresh rate. If the rendering loop runs exactly at the refresh rate, the system is a real-time image generation system, which is a goal of most interactive graphics systems.

At line one, the system reads the inputs from the computer system 100. As mentioned above, the inputs can be generated by a user of the computer system 100, by software executing on the computer system, or from any other source. The inputs specify whether there has been a pan, zoom, teleportation, or any other movement in the global coordinate space. Line two computes the new observer position with respect to the geometry of the scene relative to the received input. Line three uses the computed observer position to determine the region of interest in the source texture. Since there may be more than one object in the scene to texturize, line three may actually compute regions of interest for multiple source textures. In addition, line three can be skipped if the region of interest did not substantially change or the system no longer needs to page textures. At line four, the batch list of requests to the ARQ 214 is updated to reflect the new inputs. For example, the tile priorities in the batch list may be changed in response to the new observer position.

Line five iterates the texture loading pipeline 200 for each object in the scene to which a texture will be applied. Similarly, line six selects the texture to be used for the iteration. Line seven determines whether the selected texture has multiple levels of detail. If the texture only has a single LOD, line eight is skipped and the object is drawn using the given texture at line 10.

Otherwise, line eight sets the texture coordinate bound in order to aid in selecting the appropriate LOD. The system uses the texture coordinate bound to select the best cache level (i.e., the texture cache having the "best" textures) based on data available in the caches intersected with the coordinate bound. Line nine sets other graphical states.

In this manner, the 'while' loop executes at full speed and degrades the image quality rather than the system interactivity. If the region of interest does not change, even the slowest paging system will eventually page in the textures for the highest LOD. This behavior is desirable because it causes the image to blur when the region of interest changes quickly and produces a sharp image when the region of interest does not move, which is identical to what one would expect in real life.

In an alternative embodiment, a closed loop control is used to set the region of interest at line three. This embodiment gathers the texture coordinate bounds of all visible objects and uses that information to set the region of interest. In other words, this embodiment uses what was visible in the previous frame (and at what resolution) to predict what values should be used in a subsequent frame. While this closed loop control is effective, it introduces a frame of latency into the system and relies on reactive, instead of predictive, logic.

In sum, the present invention allows an extremely large source texture combining textures of different resolutions from different sources to be used to used to render an object in a 3-D scene. The present invention uses texture loading pipelines to page textures from particular levels of detail in the source texture into the texture cache. The best available texture is preferably used to render the object. The present invention mimics real-world behavior by providing lower-resolution textures when the region of interest in the source texture is rapidly changing and higher-resolution textures when the region of interest remains relatively stationary. The present invention also provides seamless giant texture virtualization when given enough paging bandwidth. In addition, the present invention preferably always operates in "real-time" and preferably never performs time-variant operations in a synchronous manner.

The above description is included to illustrate the operation of the preferred embodiments and is not meant to limit the scope of the invention. The scope of the invention is to be limited by only the following claims. From the above discussion, many variations will be apparent to one skilled in the relevant art that would yet be encompassed by the spirit and scope of the invention.

What is claimed is:

1. A texture loading pipeline, comprising:
   an asynchronous request queue (ARQ) for asynchronously receiving requests for texture tiles stored in a texture storage and retrieving requested texture tiles from the texture storage;
   a tile cache coupled to the ARQ for storing texture tiles retrieved by the ARQ; and
   a texture cache coupled to the tile cache for holding textures within a region of interest, the textures paged from the tile cache.

2. The texture loading pipeline of claim 1, wherein the texture storage stores a source texture having one or more levels of detail.

3. The texture loading pipeline of claim 1, wherein the ARQ retrieves requested texture tiles from a remote texture storage.

4. The texture loading pipeline of claim 1, wherein the tile cache comprises:
   a compressed tile cache for storing compressed texture tiles provided by the ARQ;
   a decompressor for decompressing compressed texture tiles stored in the compressed tile cache; and
   an uncompressed tile cache for storing uncompressed texture tiles provided by the ARQ and tiles decompressed by the decompressor.

5. The texture loading pipeline of claim 4, wherein the decompressor operates asynchronously.

6. The texture loading pipeline of claim 1, wherein the tile cache further comprises:
   an image processor for performing image processing on one or more texture tiles provided by the ARQ.

7. The texture loading pipeline of claim 6, wherein the image processor combines two or more texture tiles into a single texture tile.

8. The texture loading pipeline of claim 1, wherein the textures within the region of interest are determined responsive to a toroidal roaming of the texture tiles in the tile cache.

9. The texture loading pipeline of claim 1, wherein the texture tiles stored in the texture storage from a source texture having multiple levels of detail and wherein there is an instance of the texture loading pipeline for each level, further comprising:
   a pipeline driver coupled to the tile cache and of each instance of the texture loading pipeline for driving the texture loading pipeline.

10. The texture loading pipeline of claim 9, wherein the pipeline driver outputs the region of interest to the tile cache and the texture cache, and wherein the tile cache provides texture tile requests to the ARQ responsive to the received region of interest and wherein textures are paged from the tile cache to the texture cache responsive to the received region of interest.

11. The texture loading pipeline of claim 9, wherein the tile cache is further adapted to provide texture tile requests to the ARQ responsive to speculative paging based on the received region of interest.

12. The texture loading pipeline of claim 9, wherein the pipeline driver outputs an update time to the texture caches of one or more of the texture loading pipeline instances, wherein the update time specifies an amount of processor time available to a texture cache to page textures within the region of interest from the tile cache to the texture cache.

13. The texture loading pipeline of claim 12, wherein each instance of the texture loading pipeline supports a particular bandwidth and wherein a majority of processing time is devoted to the texture loading pipeline supporting a bandwidth determined responsive to changes in the region of interest.

14. The texture loading pipeline of claim 9, wherein the pipeline driver receives an input value specifying which of the instances of the texture loading pipelines to activate.

15. The texture loading pipeline of claim 1, wherein there are multiple texture loading pipelines and further comprising:
   a texture selector for selecting textures in a particular one of the texture caches of the multiple texture loading pipelines.

16. The texture loading pipeline of claim 15, wherein the selected textures are in an arbitrary coordinate space and further comprising:
   a texture matrix for transforming the selected textures from the arbitrary coordinate space into a global coordinate space.

17. The texture loading pipeline of claim 16, wherein there are a plurality of texture matrixes and wherein the texture selector selects a plurality of the texture caches of the multiple texture loading pipelines and applies each selected texture cache to one of the plurality of texture matrixes.

18. A computer-implemented method of using a source texture to render a three-dimensional (3-D) scene, the source texture having a plurality of levels of detail, comprising the steps of:

establishing a texture loading pipeline for each level of detail in the source texture, each texture loading pipeline having a texture cache for caching textures in a region of interest;

providing the region of interest and an update time to selected ones of the texture loading pipelines;

for each selected texture loading pipeline, updating the texture cache with the textures in the region of interest for a duration of the update time provided to the texture loading pipeline; and selecting textures in one of the texture caches for use in rendering the 3-D scene.

19. The method of claim 18, further comprising the steps of:

retrieving texture tiles from a texture storage responsive to the region of interest; and storing the retrieved texture tiles in a tile cache;

wherein textures from within the region of interest are paged from the tile cache to the texture cache during the update.

20. The method of claim 19, wherein the texture tiles in the texture storage are compressed and further comprising the step of:

decompressing the texture tiles retrieved from the texture storage.

21. The method of claim 19, wherein the updating step comprises the step of:

performing toroidal roaming on the texture tiles within the tile cache.

22. The method of claim 18, wherein the selected textures are in an arbitrary coordinate space and further comprising the step of:

transforming the selected textures from the arbitrary coordinate space into a global coordinate space.

23. The method of claim 18 wherein each texture loading pipeline supports a particular bandwidth and wherein the texture loading pipeline supporting a best bandwidth for rendering the 3-D scene is provided with a majority of the update time.

24. A computer program product comprising:

a computer-usable medium having computer-readable code embodied therein for implementing a texture loading pipeline, the computer-readable code comprising:

an asynchronous request queue (ARQ) module for asynchronously receiving requests for texture tiles stored in a texture storage and retrieving requested texture tiles from the texture storage;

a tile cache module coupled to the ARQ module for storing texture tiles retrieved by the ARQ; and a texture cache module coupled to the tile cache module for holding textures within a region of interest paged from the tile cache module.

25. The computer program product of claim 24, wherein the texture storage stores a source texture having one or more levels of detail.

26. The computer program product of claim 24, wherein the ARQ module retrieves requested texture tiles from a remote texture storage.

27. The computer program product of claim 24, wherein the tile cache module comprises:

a compressed tile cache module for storing compressed texture tiles provided by the ARQ module;

a decompressor module for decompressing compressed texture tiles stored in the compressed tile cache; and an uncompressed tile cache module for storing uncompressed texture tiles provided by the ARQ module and tiles decompressed by the decompressor module.

28. The computer program product of claim 27, wherein the decompressor module operates asynchronously.

29. The computer program product of claim 24, wherein the tile cache module further comprises:

an image processor module for performing image processing on one or more texture tiles provided by the ARQ module.

30. The computer program product of claim 29, wherein the image processor module combines two or more texture tiles into a single texture tile.

31. The computer program product of claim 24, wherein the textures within the region of interest are determined responsive to a toroidal roaming of the texture tiles in the tile cache module.

32. The computer program product of claim 24, wherein the texture tiles stored in the texture storage form a source texture having multiple levels of detail and wherein there is an instance of the texture loading pipeline for each level of detail, further comprising:

a pipeline driver module coupled to the tile cache and texture cache modules of each instance of the texture loading pipeline for driving the texture loading pipeline.

33. The computer program product of claim 32, wherein the pipeline driver module outputs the region of interest to the tile and texture cache modules, and wherein the tile cache module provides texture tile requests to the ARQ module responsive to the received region of interest and wherein textures are paged from the tile cache module to the texture cache module responsive to the received region of interest.

34. The computer program product of claim 32, wherein the pipeline driver module outputs an update time to the texture cache modules of one or more of the texture loading pipeline instances, wherein the update time specifies an amount of processor time available to a texture cache module to page textures within the region of interest from the tile cache module to the texture cache module.

35. The computer program product of claim 34, wherein a texture cache module returns data to the pipeline module specifying an amount of processor time used by the texture cache module to page textures within the region of interest from the tile cache module to the texture cache module.

36. The computer program product of claim 34, wherein each instance of the texture loading pipeline supports a particular bandwidth and wherein a majority of processing time is devoted to the texture loading pipeline supporting a bandwidth determined responsive to changes in the region of interest.

37. The computer program product of claim 32, wherein the pipeline driver module receives an input specifying which of the instances of the texture loading pipeline to activate.

38. The computer program product of claim 24, wherein there are multiple texture cache modules and further comprising:

a texture selector module for selecting textures in a particular one of the texture cache modules.

39. The computer program product of claim 38, wherein the selected textures are in an arbitrary coordinate space and further comprising:

a texture matrix module for transforming the selected textures from the arbitrary coordinate space into a global coordinate space.

* * * * *

UNITED STATES PATENT AND TRADEMARK OFFICE
CERTIFICATE OF CORRECTION

PATENT NO. : 6,618,053 B1
DATED : September 9, 2003
INVENTOR(S) : Christopher C. Tanner It is certified that error appears in the above-identified patent and that said Letters Patent is hereby corrected as shown below:

<u>Title page,</u>
Item [56], References Cited, the following references should be included:
-- U.S. PATENT DOCUMENTS
| | | | |
|---|---|---|---|
| 5,696,892 A * | 12/1997 | Redmann et al. | 345/582 |
| 5,760,792 A * | 6/1998 | Holt et al. | 345/558 |
| 5,880,737 A * | 3/1999 | Griffin et al. | 345/582 |
| 6,233,647 A * | 5/2001 | Bentz et al. | 345/557 |
| 6,353,438 A * | 3/2002 | Van Hook et al. | 345/552 -- |

OTHER PUBLICATIONS, the following references should be included:
-- * "The design and analysis of a cache architecture for texture mapping," by Z. Hakura et al., ISCA'97 Denver, CO, 1997 ACM, pages 108-120.

* "Multi-level texture caching for 3D graphics hardware" by M. Cox et al., ICCA, Proceedings of 25th international symposium on computer architecture, 1998, Barcelona, Spain, pages 86-97.

* "Prefetching in a texture cache architecture" by H. Igehy et al., SIGGRAPH/ EUROGRAPHICS, Aug. 31-Sep. 1, 1998, pages 13-142. --

UNITED STATES PATENT AND TRADEMARK OFFICE
CERTIFICATE OF CORRECTION

PATENT NO.    : 6,618,053 B1
DATED         : September 9, 2003
INVENTOR(S)   : Christopher C. Tanner It is certified that error appears in the above-identified patent and that said Letters Patent is hereby corrected as shown below:

<u>Column 12,</u>
Lines 23 through 29, should read as follows:
-- 9. The texture loading pipeline of claim 5, wherein the texture tiles stored in the texture storage form a source texture having multiple levels of detail and wherein there is an instance of the texture loading pipeline for each level of detail, further comprising:
    a pipeline driver coupled to the tile cache and the texture cache of each
        instance of the texture loading pipeline for driving the texture
        loading pipeline. --

Signed and Sealed this

Third Day of February, 2004

JON W. DUDAS
*Acting Director of the United States Patent and Trademark Office*